US010044435B2

(12) United States Patent
Baudoin et al.

(10) Patent No.: US 10,044,435 B2
(45) Date of Patent: Aug. 7, 2018

(54) METHOD FOR TRANSPARENT ON-BOARD ROUTING OF DATA PACKETS AT VERY HIGH BIT RATE IN A SPACE TELECOMMUNICATION SYSTEM USING A NETWORK OF AT LEAST ONE REGENERATIVE SATELLITE(S)

(71) Applicant: THALES, Courbevoie (FR)

(72) Inventors: Cédric Baudoin, Toulouse (FR); Nicolas Chuberre, Toulouse (FR); Jean-Didier Gayrard, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/423,522

(22) Filed: Feb. 2, 2017

(65) Prior Publication Data
US 2017/0230105 A1 Aug. 10, 2017

(30) Foreign Application Priority Data

Feb. 5, 2016 (FR) ..................................... 16 00195

(51) Int. Cl.
H04B 7/185 (2006.01)
H04L 12/723 (2013.01)

(52) U.S. Cl.
CPC ..... H04B 7/18584 (2013.01); H04B 7/18517 (2013.01); H04B 7/18521 (2013.01);
(Continued)

(58) Field of Classification Search
CPC ............ H04B 7/18584; H04B 7/18517; H04B 7/18521; H04B 7/18523; H04L 45/502
See application file for complete search history.

(56) References Cited

U.S. PATENT DOCUMENTS

2008/0225900 A1\* 9/2008 Henriksson ............ H04H 20/30
370/509
2009/0022085 A1\* 1/2009 Dankberg .......... H04B 7/18582
370/316
(Continued)

OTHER PUBLICATIONS

"Digital Video Broadcasting (DVB); Generic Stream Encapsulation (GSE) Protocol," European Telecommunications Standards Institute, ETSI TS 102 606, V1.1.1 (Oct. 2007).
(Continued)

Primary Examiner — Redentor Pasia
(74) Attorney, Agent, or Firm — Baker & Hostetler LLP

(57) ABSTRACT

A method for transparent on-board routing of data packets at high bit rate is implemented by a telecommunication system comprising an origin transmitting station, a first destination receiving station, a second destination receiving station, and a plurality of at least two satellites. The origin transmitting station segments high bit rate data streams into coded or uncoded packets each having the structure of a coded or uncoded DVB-S2 baseband frame BBFRAME; and the origin transmitting station inserts, for each segmented BBFRAME packet, coded or uncoded, an on-board routing label of a single piece respectively associated with the coded or uncoded BBFRAME packet. The on-board routing label contains an identifier of the destination receiving station associated with the coded BBFRAME packet, out of the first destination receiving station and the second destination receiving station.

16 Claims, 9 Drawing Sheets

(52) U.S. Cl.
CPC ....... *H04B 7/18523* (2013.01); *H04L 45/502* (2013.01); *H04L 2212/00* (2013.01)

(56) References Cited

U.S. PATENT DOCUMENTS

| | | | | |
|---|---|---|---|---|
| 2013/0315346 | A1* | 11/2013 | Varma | H04L 7/0008 |
| | | | | 375/316 |
| 2014/0064280 | A1* | 3/2014 | Qin | H04B 7/18582 |
| | | | | 370/392 |
| 2014/0226682 | A1* | 8/2014 | Becker | H04B 7/18523 |
| | | | | 370/474 |
| 2014/0341118 | A1* | 11/2014 | Lee | H04L 45/74 |
| | | | | 370/329 |
| 2016/0037434 | A1 | 2/2016 | Gopal et al. | |

OTHER PUBLICATIONS

"Digital Video Broadcasting (DVB); Second generation framing structure; channel coding and modulation systems for Broadcasting, Interactive Services; News Gathering and other broadband satellite applications; Part 1: DVB-S2ETSI DVB S2," European Telecommunications Standards Institute, ETSI EN 302 307-1, V1.4.1 (Nov. 2014).

"Digital Video Broadcasting (DVB); Generic Stream Encapsulation (GSE); Part 1: Protocol," Technical Specification, European Telecommunications Standards Institute (ETSI), vol. BROADCAS, No. V1.2.1, Jul. 1, 2014, XP014214603.

"Digital Video Broadcasting (DVB); Generic Stream Encapsulation (GSE) implementation guidelines," Technical Specification, European Telecommunications Standards Institute (ETSI), vol. BROADCAS, No. V.1.2.1, May 1, 2011, XP014064621.

* cited by examiner

Uncoded BBFRAME

METHOD FOR TRANSPARENT ON-BOARD ROUTING OF DATA PACKETS AT VERY HIGH BIT RATE IN A SPACE TELECOMMUNICATION SYSTEM USING A NETWORK OF AT LEAST ONE REGENERATIVE SATELLITE(S)

CROSS-REFERENCE TO RELATED APPLICATIONS

This application claims priority to foreign French patent application No. FR 1600195, filed on Feb. 5, 2016, the disclosure of which is incorporated by reference in its entirety.

FIELD OF THE INVENTION

The present invention relates to a method for transparent on-board routing of data packets at very high bit rate implemented in a space telecommunication system using a network of regenerative satellites, provided with inter-satellite links ISL or at least one regenerative geostationary satellite.

The present invention relates also to a high bit rate satellite space telecommunication system, configured to implement said transparent packet routing method.

The technical field of the invention relates in particular to the constellations of satellites, for example that of the LEOSAT system, intended to provide trunking/backhauling services at very high bit rate, that is to say services with a bit rate higher than 50 Mbps per terminal on the ground, with inter-satellite links ISL for defining a legacy network in space without ground infrastructure.

BACKGROUND

To date, three types of on-board switching solutions are implemented in the satellites to switch data packets of small size at relatively low bit rates.

The solutions of a first type use the ATM ("Asynchronous Transfer Mode") or MPEG2-TS ("Moving Pictures Experts Group—Transport Stream") protocols which allow for an effective switching of the packets concerned because of their small size and their fixed size. On the other hand, this type of switching results in an extremely high number of data packets to be processed, incompatible with the processing power constraints imposed by the onboard processors embedded onboard the satellites, if these extremely high bit rates are considered. Furthermore, these packet formats or these frame structures involve an overhead of significant size commensurately reducing the useful bit rate available.

The solutions of a second type are based on the generic stream encapsulation (GSE) protocol as defined in the ETSI ("European Telecommunication Standard Institute") technical standard with the reference ETSI TS 102 606 V1.1.1 (2007-10) and entitled "Digital Video Broadcasting (DVB); Generic Stream Encapsulation (GSE) Protocol". These solutions of the second type make it possible to somewhat limit the number of packets to be processed, although this number still remains very high. Furthermore, the variable size of these packets requires issues of segmentation and of concatenation to be managed, which limits the gains in terms of reduction of the complexity of the onboard processing operations.

The solutions of a third type are based, for their part, on the internet protocol and are well suited to internet traffic, but they also involve a large number of packets of variable size to be processed in the case of a high bit rate link. Furthermore, working at the IP level entails implementing onboard reassembly, which results in a significant increase in the onboard buffer memories and the onboard computing power needed.

In the case of very high capacity space systems, that is to say those having a transmission capacity greater than 10 Gbps (gigabits per second), the solutions described above require a very high onboard complexity, which linearly increases with the number of data packets to be processed.

The technical problem is how to significantly reduce the onboard processing operations on the satellites for the switching and the routing of data packets at very high bit rate transiting via a network of regenerative satellites, provided with inter-satellite links ISL or via a regenerative geostationary satellite provided with an internal router.

SUMMARY OF THE INVENTION

To this end, the subject of the invention is a method for transparent on-board routing of data packets at high bit rate, implemented by a satellite telecommunication system. The satellite telecommunication system comprises:
an origin transmitting station, a first destination receiving station, a second destination receiving station, and a plurality of at least one satellite(s);
a first radiofrequency uplink which connects the origin transmitting station to a first satellite of the plurality, configured as an origin satellite with respect to the origin transmitting station;
a second radiofrequency downlink which connects, in a first configuration, the first destination receiving station to a second satellite of the plurality, configured as a first destination satellite with respect to the first destination receiving station, or which connects, in a second configuration and a third configuration, the first destination receiving station to the first satellite, configured as a first destination satellite with respect to the first destination receiving station;
a third radiofrequency downlink which connects, in the first configuration, the second destination receiving station to a third satellite of the plurality, configured as a second destination satellite with respect to the second destination receiving station, or which connects, in the second configuration, the second destination receiving station to a second satellite of the plurality, configured as a second destination satellite with respect to the second destination receiving station, or which connects, in the third configuration, the second destination receiving station to the first satellite, configured as a second destination satellite, with respect to the second destination receiving station. The first, second and third satellites of the first configuration, or the first and second satellites of the second configuration are interconnected with one another by a space network comprising at least two or at least one inter-satellite link(s), and the first satellite of the third configuration comprises an internal router. The transparent on-board routing method is characterized in that:
the origin transmitting station segments high bit rate data streams received into coded or uncoded BBFRAME packets each having the structure of a coded or uncoded baseband frame BBFRAME as defined by the DVB-S2 protocol; and
the origin transmitting station inserts, for each BBFRAME packet, coded or uncoded, an on-board routing label of a single piece respectively associated with said coded or uncoded BBFRAME packet, by including the on-board routing label in and at the start of a payload data field of said BBFRAME packet when the BBFRAME packet is uncoded, or by externally adding the on-board routing label to said BBFRAME packet when the BBFRAME packet is coded. The on-board routing label associated with said coded or uncoded BBFRAME packet contains an identifier of the destination receiving station associated with said coded BBFRAME packet, out of the first destination receiving station and the second destination receiving station (8; 58; 108).

According to particular embodiments, the method for transparent on-board routing of data packets comprises one or more of the following features:

the transparent on-board routing method comprises the steps consisting in that:

in a first step, the origin transmitting station segments high bit rate data streams received into uncoded BBFRAME packets of large size each having the structure of an uncoded baseband frame BBFRAME as defined by the DVB-S2 protocol and in which a data field is reserved in the header and in the payload of the uncoded BBFRAME packet to receive an on-board routing label of an associated single piece, containing an identifier of the destination receiving station associated with said uncoded BBFRAME packet; then in a second step, the origin transmitting station inserts, into the routing label, an identifier of the destination receiving station associated with said uncoded BBFRAME packet, codes the completed uncoded BBFRAME packet as a coded BBFRAME packet, and transmits the coded BBFRAME packet to the first satellite, configured as origin satellite, the coded BBFRAME packet transmitted being modulated by a predetermined modulation, defined according to the DVB-S2 protocol and compatible with the code used for the DVB-S2 packet; then in a third step, the first origin satellite receives, demodulates and decodes each coded BBFRAME packet, transmitted by the origin transmitting station in the second step, and extracts from the on-board routing label the information identifying the destination receiving station to route, transparently using the space network, the decoded BBFRAME packet to the destination satellite corresponding to the destination receiving station of the uncoded BBFRAME packet;

the first step comprises a fourth step and a fifth step executed in succession, the fourth step consisting in the origin transmitting station segmenting high bit rate data streams received into uncoded BBFRAME packets each having the structure of a baseband frame before coding as defined in the DVB-S2 protocol; the fifth step consisting in the origin transmitting station switching, according to their associated destination receiving station, the uncoded BBFRAME packets whose associated destination receiving stations are the first destination receiving station and/or the second destination receiving station on a first queue defining a first logical channel associated with the first destination receiving station and a second queue defining a first logical channel associated with the second destination receiving station;

the transparent on-board routing method comprises the steps consisting in that:

in a first step, the origin transmitting station segments and codes high bit rate data streams received as coded BBFRAME packets each having the structure of a coded baseband frame BBFRAME as defined by the DVB-S2 protocol and having an associated destination receiving station out of the first destination receiving station and the second destination receiving station; then in a second step, the origin transmitting station adds the on-board routing label associated with said BBFRAME packet coded and formed in the first step to said coded BBFRAME packet, and transmits the assembly formed by the coded BBFRAME packet and its associated on-board routing label to the first satellite configured as the origin satellite, the coded BBFRAME packet and the respectively associated label of a single piece, transmitted grouped together, being modulated by one and the same modulation defined according to the DVB-S2 protocol and compatible with the code used for the coded DVB-S2 packet; then in a third step, the first origin satellite receives and demodulates each coded BBFRAME packet and its corresponding added label transmitted by the first transmitting station in the second step, and extracts from the on-board routing label the information identifying the destination receiving station to route, transparently using the space network, the coded BBFRAME packet to the destination satellite corresponding to the destination receiving station of the coded BBFRAME packet;

the first step comprises a fourth step and a fifth step executed in succession; the fourth step consisting in that the origin transmitting station segments high bit rate data streams received into uncoded BBFRAME packets each having the structure of a baseband frame before coding as defined in the DVB-S2 protocol; the fifth step consisting in that the origin transmitting station either codes the uncoded BBFRAME packets as coded BBFRAME packets then switches, according to their associated destination receiving station, the coded BBFRAME packets whose associated destination receiving stations are the first destination receiving station and/or the second destination receiving station on a first queue defining a first logical channel associated with the first destination receiving station and a second queue defining a first logical channel associated with the second destination receiving station, or switches, according to their associated destination receiving station, the uncoded BBFRAME packets whose associated destination receiving stations are the first destination receiving station and/or the second destination receiving station on a first queue defining a first logical channel associated with the first destination receiving station and a second queue defining a first logical channel associated with the second destination receiving station, then, at the output of each queue, codes the uncoded BBFRAME packets as coded BBFRAME packets;

the on-board routing label added is coded by a coding dedicated exclusively to the label at a fixed rate, independent of the transmitting station and of the receiving stations;

the transparent on-board routing method further comprises a sixth step, executed after the third step, during which the first origin satellite generates routing information for the coded or uncoded data packet on the basis of the information identifying the destination receiving station and predetermined signalling information concerning optimized transit paths for the data packet, that can be used within the space network between the origin satellite and the relevant destination satellite or within the internal router, and encodes it in a dedicated data field of the routing label according to a predetermined protocol, dedicated to the space network or to the internal router;

the on-board routing label is or includes a label defined according to the MPLS ("Multi-Protocol Label Switching") protocol or a label defined according to the Ethernet VLAN protocol or a PLHEADER label;

the on-board routing label comprises additional information included in the set formed by a first measurement of a first signal-to-noise-plus-interference ratio of the uplink from the transmitting station to the origin satellite, second measurements of second signal-to-noise-plus-interference ratios of the downlinks from the destination receiving stations to the transmitting station, and numbers of a numbering system for a rescheduling;

each BBFRAME packet before coding comprises one or more GSE packets defined according to the GSE protocol;

the telecommunication system further comprises at least one additional destination receiving station and one additional satellite, the additional satellite being different from the second and third destination satellites, configured as a destination satellite with respect to the destination receiving station, and connected directly to the additional destination receiving station by an additional radiofrequency downlink from the additional destination satellite; the first origin satellite, the second, third destination satellites and the at least one additional destination satellite being interconnected with one another by the space network; and the origin transmitting station segments high bit rate data streams received into coded or uncoded BBFRAME packets, the coded or uncoded BBFRAME packets each having the structure of a coded or uncoded baseband frame BBFRAME as defined by the DVB-S2 protocol and an associated destination receiving station out of the second destination receiving station, the third destination receiving station and the at least one additional destination receiving station.

Another subject of the invention is a satellite telecommunication system according to a first embodiment for supplying high bit rate telecommunication services comprising:

an origin transmitting station, a first destination receiving station, a second destination receiving station, and a plurality of at least one satellite(s); and a first radiofrequency uplink which connects the origin transmitting station to a first satellite of the plurality, configured as an origin satellite with respect to the origin transmitting station;

a second radiofrequency downlink which connects, in a first configuration, the first destination receiving station to a second satellite of the plurality, configured as a first destination satellite with respect to the first destination receiving station, or which connects, in a second configuration and a third configuration, the first destination receiving station to the first satellite, configured as a first destination satellite with respect to the first destination receiving station;

a third radiofrequency downlink which connects, in the first configuration, the second destination receiving station to a third satellite of the plurality, configured as a second destination satellite with respect to the second destination receiving station, or which connects, in the second configuration, the second destination receiving station to a second satellite of the plurality, configured as a second destination satellite with respect to the second destination receiving station, or which connects, in the third configuration, the second destination receiving station to the first satellite, configured as a second destination satellite with respect to the second destination receiving station. The first, second and third satellites of the first configuration or the first and second satellites of the second configuration being interconnected with one another by a space network comprise at least two or at least one inter-satellite link(s), and the first satellite of the third configuration comprises an internal router. The satellite telecommunication system is characterized in that:

the origin transmitting station is configured to, in a first step, segment and code high bit rate data streams received as coded BBFRAME packets each having the structure of a coded baseband frame BBFRAME as defined by the DVB-S2 protocol and an associated destination receiving station out of the first destination receiving station and the second destination receiving station; then, in a second step, add, to said BBFRAME packet coded and formed in the first step, an associated on-board routing label, and transmit the assembly formed by the BBFRAME packet and its associated on-board routing label to the first satellite configured as origin satellite, the on-board routing label associated with said coded BBFRAME packet containing an identifier of the destination receiving station associated with said coded BBFRAME packet, and the coded BBFRAME packet and the respectively associated on-board routing label of a single piece, transmitted grouped together, being modulated by one and the same modulation defined according to the DVB-S2 protocol and compatible with the code used for the DVB-S2 packet; and the first origin satellite is configured to, in a third step, receive and demodulate each coded BBFRAME packet and its corresponding added on-board routing label, transmitted by the origin transmitting station in the second step, and extract from the on-board routing label the information identifying the destination receiving station to route, transparently using the space network, the coded BBFRAME packet to the destination satellite corresponding to the destination receiving station of the coded BBFRAME packet.

According to particular embodiments of the first embodiment of the system, the satellite telecommunication system comprises one or more of the following features:

the first origin transmitting station is configured to, in a fourth step included in the first step, segment the high bit rate data streams received into uncoded BBFRAME packets each having the structure of a baseband frame before coding as defined in the DVB-S2 protocol; then, in a fifth step, following the fourth step, either code the uncoded BBFRAME packets as coded BBFRAME packets then switch, according to their associated destination receiving station, the coded BBFRAME packets whose associated destination receiving stations are the first destination receiving station and/or the second destination receiving station on a first queue defining a first logical channel associated with the first destination receiving station and a second queue defining a first logical channel associated with the second destination receiving station, or switch, according to their associated destination receiving station, the uncoded BBFRAME packets whose associated destination receiving stations are the first destination receiving station and/or the second destination receiving station on a first queue defining a first logical channel associated with the first destination receiving station and a second queue defining a first logical channel associated with the second destination receiving station, then, at the output of each queue, code the uncoded BBFRAME packets as coded BBFRAME packets.

Another subject of the invention is a satellite telecommunication system according to a second embodiment for supplying high bit rate telecommunication services comprising:

an origin transmitting station, a first destination receiving station, a second destination receiving station, and a plurality of at least one satellite(s); and a first radiofrequency uplink which connects the origin transmitting station to a first satellite of the plurality, configured as an origin satellite with respect to the origin transmitting station;

a second radiofrequency downlink which connects, in a first configuration, the first destination receiving station to a second satellite of the plurality, configured as a first destination satellite with respect to the first destination receiving station, or which connects, in a second configuration and a third configuration, the first destination receiving station to the first satellite, configured as a first destination satellite with respect to the first destination receiving station;

a third radiofrequency downlink which connects, in the first configuration, the second destination receiving station to a third satellite of the plurality, configured as a second destination satellite with respect to the second destination receiving station, or which connects, in the second configuration, the second destination receiving station to a second satellite of the plurality, configured as a second destination satellite with respect to the second destination receiving station, or which connects, in the third configuration, the second destination receiving station to the first satellite, configured as a second destination satellite with respect to the second destination receiving station. The first, second and third satellites of the first configuration or the first and second satellites of the second configuration, are interconnected with one another by a space network comprising at least two or at least one inter-satellite link(s), and the first satellite of the third configuration comprises an internal router. The satellite telecommunication system is characterized in that:

the origin transmitting station is configured to, in a first step, segment high bit rate data streams received into uncoded BBFRAME packets of large size each having the structure of an uncoded baseband frame BBFRAME as defined by the DVB-S2 protocol and in which a data field is reserved in the header and in the payload of the uncoded BBFRAME packet to receive an on-board routing label of an associated single piece, containing an identifier of the destination receiving station associated with said uncoded BBFRAME packet; and the origin transmitting station is configured to, in a second step, insert, into the on-board routing label, an identifier of the destination receiving station associated with said uncoded BBFRAME packet, code the completed uncoded BBFRAME packet as a coded BBFRAME packet, and transmit the coded BBFRAME packet to the first satellite, configured as origin satellite, the coded BBFRAME packet transmitted being modulated by a predetermined modulation, defined according to the DVB-S2 protocol and compatible with the code used for the DVB-S2 packet; and the first origin satellite is configured to, in a third step, receive, demodulate and decode each coded BBFRAME packet, transmitted by the origin transmitting station in the second step, and extract from the on-board routing label the information identifying the destination receiving station to route, transparently using the space network, the decoded BBFRAME packet to the destination satellite corresponding to the destination receiving station of the uncoded BBFRAME packet.

According to particular embodiments of the second embodiment of the system, the satellite telecommunication system comprises one or more of the following features:

the origin transmitting station is configured to, in a fourth step included in the first step, segment high bit rate data streams received into uncoded BBFRAME packets each having the structure of a baseband frame before coding as defined in the DVB-S2 protocol; and the origin transmitting station is configured to, in a fifth step following the fourth step, switch, according to their associated destination receiving station, the uncoded BBFRAME packets whose associated destination receiving stations are the first destination receiving station and/or the second destination receiving station on a first queue defining a first logical channel associated with the first destination receiving station and a second queue defining a first logical channel associated with the second destination receiving station.

Another subject of the invention is a computer product or program comprising a set of instructions configured to implement the transparent routing method defined as described above when they are loaded into and executed by a computer or several computers, implemented in the telecommunication system as defined above.

BRIEF DESCRIPTION OF THE DRAWINGS

The invention will be better understood on reading the following description of several embodiments, given purely by way of example and with reference to the drawings in which.

DETAILED DESCRIPTION

The basic principle of the invention is founded on a switching, direct and transparent to within a modulation, performed onboard at least one satellite, of packets of large sizes organized according to frames defined by the DVB-S2 ("Digital Video Broadcasting") standard according to a switching or on-board routing label. This on-board switching label can be inserted on the ground or deduced as a function of the spot-frequency pair of the access to the space segment, if this pair allows a unique identification of the transmitting station accessing an origin satellite. This switching label, retrieved onboard after demodulation and possibly decoding, or deduced, is then used for the on-board switching itself.

Hereinbelow, a terminal, fixed or mobile on the ground, or embedded onboard an aircraft, or a stratospheric balloon, will be designated by the term "station".

Figure 1:
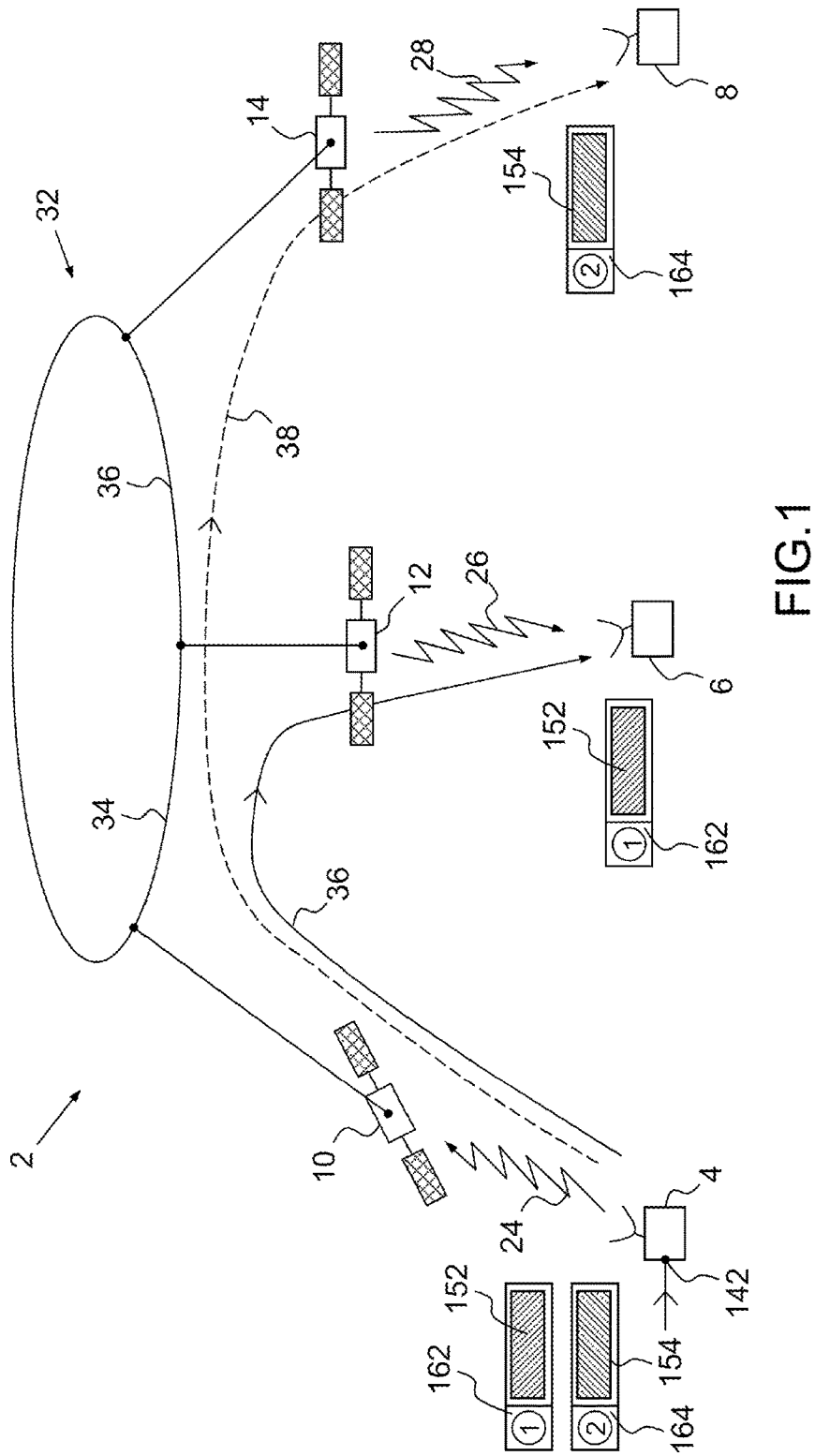
FIG. 1 is a view of a first configuration of a telecommunication system according to the invention.

According to FIG. 1 and a first configuration, a satellite telecommunication system 2 according to the invention is configured to supply high bit rate telecommunication services, that is to say route services with a bit rate higher than 50 Mbps per terminal or station.

The telecommunication system 2 comprises an origin transmitting station 4, a first destination receiving station 6, a second destination receiving station 8, a first satellite 10 configured as an origin satellite with respect to the origin transmitting station, a second satellite 12 configured as a first destination satellite with respect to the first destination receiving station 6, and a third satellite 14 configured as a second destination satellite with respect to the second destination receiving station 8.

The first satellite 10 is connected directly to the origin transmitting station 4 by a first radiofrequency uplink 24 which starts from the origin transmitting station 4.

The second satellite 12 is connected directly to the first destination receiving station 6 by a second radiofrequency downlink 26 which starts from the second satellite 12 configured as a destination satellite.

The third satellite 14 is connected directly to the second destination receiving station 8 by a third radiofrequency downlink 28 which starts from the third satellite 14 configured as a destination satellite.

The first, second and third satellites 10, 12, 14 are interconnected by a space network 32 comprising at least two inter-satellite links and possibly other satellites forming additional nodes of said network, not represented.

It is noteworthy that, despite the representation of the space network 32 in FIG. 1 by a ring, the space network may not include any loop and may be an open network.

Here in FIG. 1, a minimum topology of the space network is represented in which a first inter-satellite link 34 links the first satellite 10 to the second satellite 12, and a second inter-satellite link 36 links the second satellite 12 to the third satellite 14.

According to this minimum topology of the space network 32, a data packet, sent by the origin transmitting station 4 to the first destination receiving station 6, is configured to take a first routing path 36, plotted by a continuous line in FIG. 1, which transits in succession through the first satellite 10, as origin and intermediate relay satellite, and through the second satellite 12 as destination satellite. A data packet, sent by the origin transmitting station 4 to the second destination receiving station 8, is configured to take a second routing path 38, plotted by dotted lines, which transits in succession through the first satellite 10, as origin and intermediate relay satellite, through the second satellite 12 as intermediate relay satellite, and through the third satellite 14 as destination satellite.

Figure 2:
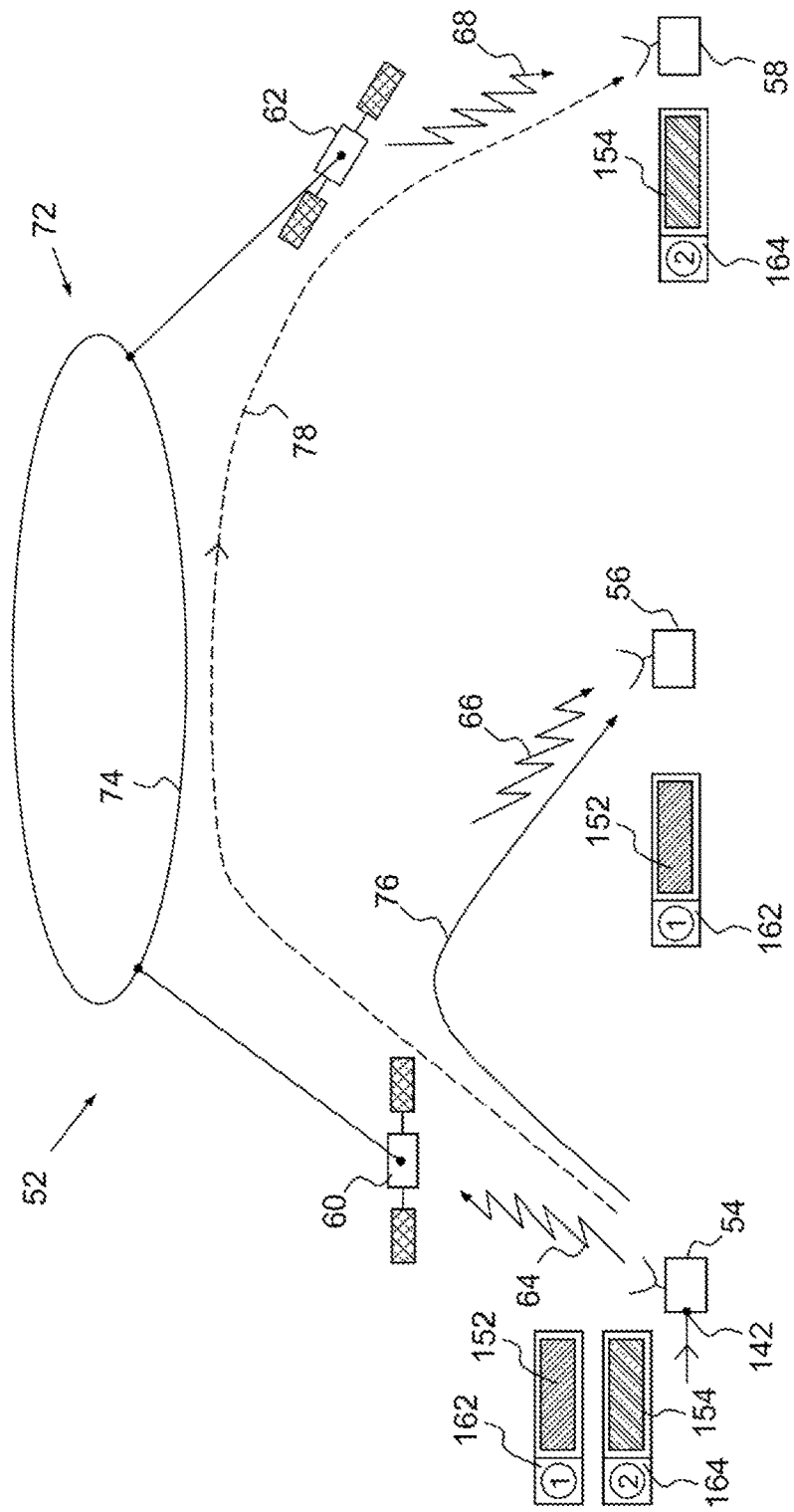
FIG. 2 is a view of a second configuration of a telecommunication system according to the invention.

According to FIG. 2 and a second configuration, a satellite telecommunication system 52 according to the invention is configured to supply high bit rate telecommunication services.

The telecommunication system 52 comprises an origin transmitting station 54, a first destination receiving station 56, a second destination receiving station 58, a first satellite 60 configured both as a first origin satellite with respect to the origin transmitting station 54 and as a first destination satellite with respect to the first destination receiving station 56, and a second satellite 62, configured as a second destination satellite with respect to the second destination receiving station 58.

The first satellite 60 is connected directly to the origin transmitting station 54 by a first radiofrequency uplink 64 which starts from the origin transmitting station 54.

The first satellite 60 is connected directly to the first destination receiving station 56 by a second radiofrequency downlink 66 which starts from the first satellite 60, configured here as a destination satellite with respect to the first destination receiving station 56.

The second satellite 62 is connected directly to the second destination receiving station 58 by a third radiofrequency downlink 68 which starts from the second satellite 62 configured as a destination satellite with respect to the second destination receiving station 58.

The first and second satellites 69, 62 are interconnected by a space network 72 comprising at least one inter-satellite link and possibly other satellites forming additional nodes of said network, not represented.

It should be noted that, despite the representation of the space network by a ring in FIG. 2, the space network 72 may not include any loop and may be an open network.

Here in FIG. 2, a minimum topology of the space network 72 is represented in which an inter-satellite link 74 links the first satellite 60 to the second satellite 62.

According to this minimum topology of the space network 72, a data packet, sent by the origin transmitting station 54 to the first destination receiving station 56, is configured to take a first routing path 76, plotted by a continuous line, which transits through the first satellite 60, as origin and destination satellite. A data packet, sent by the origin transmitting station 54 to the second destination receiving station 58, is configured to take a second routing path 78, plotted by dotted lines, which transits in succession through the first satellite 60 as origin and intermediate relay satellite, and through the second satellite 62 as destination satellite.

Figure 3:
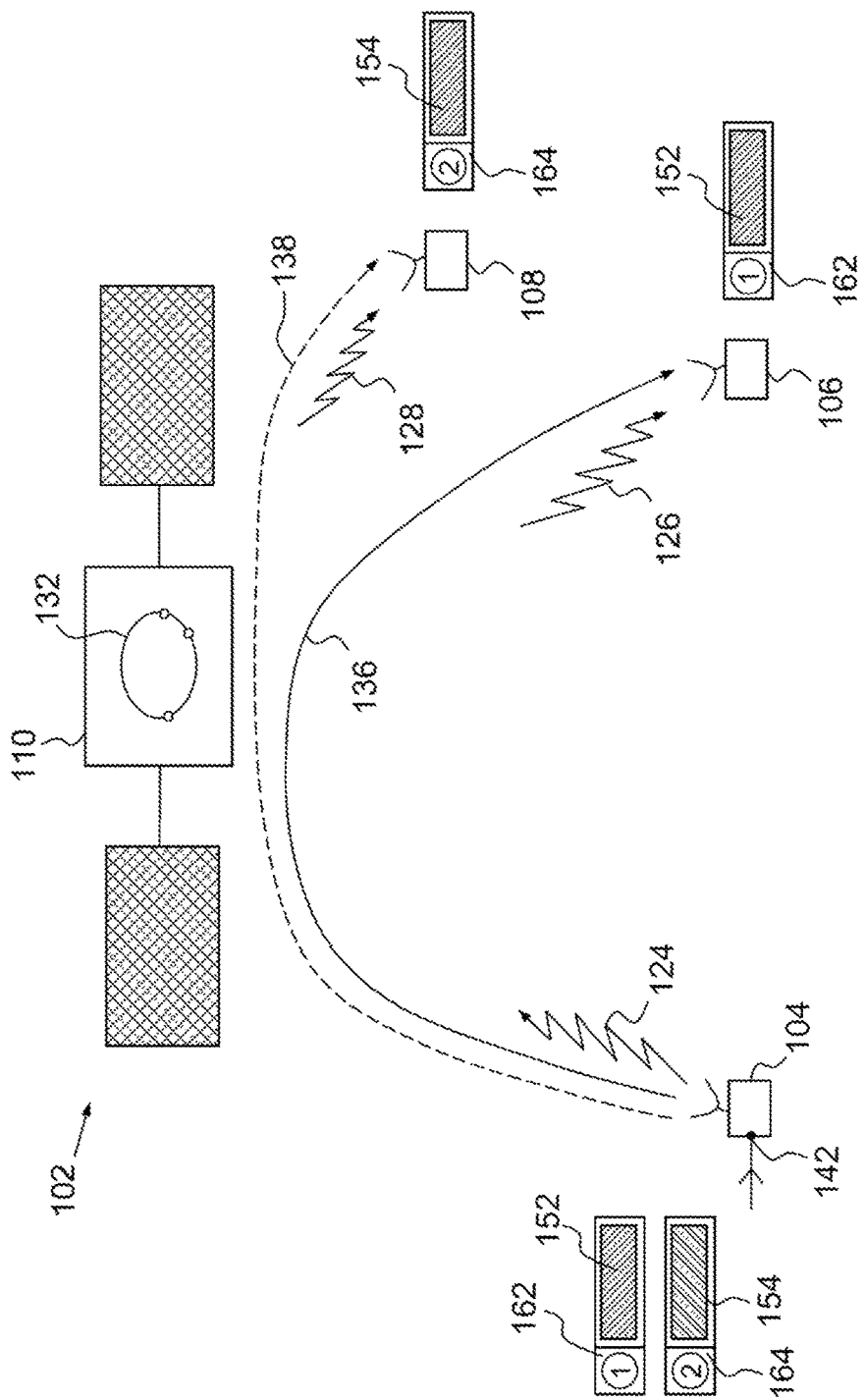
FIG. 3 is a view of a third configuration of a telecommunication system according to the invention.

According to FIG. 3 and a third configuration, a satellite telecommunication system 102 according to the invention is configured to supply high bit rate telecommunication services.

The telecommunication system comprises an origin transmitting station 104, a first destination receiving station 106, a second destination receiving station 108, a first geostationary satellite 110, configured at the same time as a first origin satellite with respect to the origin transmitting station 104, as a first destination satellite with respect to the first destination receiving station 106 and as a second destination satellite with respect to the second destination receiving station 108.

The first satellite 110 is connected directly to the origin transmitting station by a first radiofrequency uplink 124 which starts from the origin transmitting station.

The first satellite 110 is connected directly to the first destination receiving station 106 by a second radiofrequency downlink 126 which starts from the first satellite 104, configured here as a destination satellite with respect to the first destination receiving station 106.

The first satellite 110 is connected directly to the second destination receiving station 108 by a third radiofrequency downlink 128 which starts from the first satellite 110, configured as a destination satellite with respect to the second destination receiving station 108.

The first satellite 110 is a regenerative geostationary satellite comprising an internal router 132. The internal router 132 is configured to route and switch a data packet, sent by the origin station 104 and of which the destination receiving station is known, over the radiofrequency link out of the second and third radiofrequency links 126, 128 allowing the routing thereof to said destination receiving station. Thus, when the destination receiving station of a data packet is the first destination receiving station 106 the data packet is configured to take a first routing path 136, plotted by continuous line, which transits through the internal router 132 of the first satellite 110, as origin and destination satellite, and culminates via the second radiofrequency downlink 126 at the first destination receiving station 106. A data packet, sent by the origin transmitting station 104 to the second destination receiving station 108, is configured to take a second routing path 138, plotted by dotted lines, which transits through the internal router 132 of the first satellite 110, as origin and destination satellite, and culminates via the third radiofrequency link 128 at the second destination receiving station 108.

According to FIGS. 1 to 3, and generally, the origin transmitting stations 4, 54, 104 are each configured to:

segment high bit rate data streams received at an input port 142 of the coded or uncoded packets 152, 154 each having the structure of a coded or uncoded baseband frame BBFRAME as defined by the DVB-S2 protocol, and each having an associated destination receiving station out of the first destination receiving station and the second destination receiving station; then insert, for each segmented BBFRAME packet, coded or uncoded, an on-board routing label of a single piece 162, 164, respectively associated with said coded or uncoded BBFRAME packet, 152, 154, by including the routing label 162, 164 in and at the start of a payload data field of said BBFRAME packet when the BBFRAME packet is uncoded, or by externally adding the routing label 162, 164 to said BBFRAME packet when the BBFRAME packet is coded.

The on-board routing label 162, 164, associated with said BBFRAME packet 152, 154, coded or uncoded, contains an identifier of the destination receiving station associated with said coded BBFRAME packet, out of the first destination receiving station 6, 56, 106 and the second destination receiving station 8, 58, 108.

According to the configurations of FIGS. 1 to 3 and a first embodiment of the invention, the origin transmitting stations 4, 54, 104 are each configured to:

segment, in a first step, high bit rate data streams received into uncoded packets of large size each having the structure of an uncoded baseband frame BBFRAME as defined by the DVB-S2 protocol and in which a data field is reserved in the header and in the payload of the uncoded BBFRAME packet to receive an on-board routing label of a single piece, containing an identifier of the destination receiving station associated with said uncoded BBFRAME packet; then in a second step, insert, into the routing label, an identifier of the destination receiving station associated with said uncoded BBFRAME packet, code the uncoded BBFRAME packet as a coded BBFRAME packet, and transmit the coded BBFRAME packet to the first satellite, configured as origin satellite.

The coded BBFRAME packet is transmitted by being modulated by a predetermined modulation, defined according to the DVB-S2 protocol and compatible with the code used for the DVB-S2 packet.

The first origin satellite is configured to, in a third step, receive, demodulate and decode each coded BBFRAME packet, transmitted by the origin transmitting station in the second step, and extract from the on-board routing label the information identifying the destination receiving station to route, transparently using the space network, the decoded BBFRAME packet to the destination satellite corresponding to the destination receiving station of the uncoded BBFRAME packet.

The destination satellite, corresponding to the destination receiving station of the uncoded BBFRAME packet, is configured to transmit, in a fourth step, a coded BBFRAME packet corresponding to the uncoded BBFRAME packet by coding the uncoded BBFRAME packet and by modulating it through a code and a modulation that are predetermined and defined according to the DVB-S2 protocol.

According to FIGS. 1 to 3 and a second embodiment of the invention, the transmitting stations 4, 54, 104 are each configured to:

segment and code, in a first step, high bit rate data streams received at a respective input port as coded packets each having the structure of a coded baseband frame BBFRAME as defined by the DVB-S2 protocol and an associated destination receiving station out of the first receiving station and the second receiving station; then add, in a second step, to said coded BBFRAME packet, an on-board routing label of an associated single piece, and transmit, to the first origin satellite on a same data stream, the assembly formed by the coded BBFRAME packet and its associated on-board routing label.

The on-board routing label associated respectively with said coded BBFRAME packet contains an identifier of the destination receiving station, associated with said coded BBFRAME packet.

The coded BBFRAME packet and the respectively associated on-board routing label of a single piece are transmitted grouped together by being modulated by one and the same predetermined modulation, defined according to the DVB-S2 protocol and compatible with a predetermined code used for the DVB-S2 packet.

The first origin satellite is configured to demodulate, in a third step, each coded BBFRAME packet and its corresponding added label, transmitted by the origin transmitting station in the second step, and extract from the on-board routing label the information identifying the destination receiving station to route, transparently using the space network 32, 72 or the internal router 132, the coded BBFRAME packet to the destination satellite corresponding to the destination receiving station of the coded BBFRAME packet.

Figure 4:
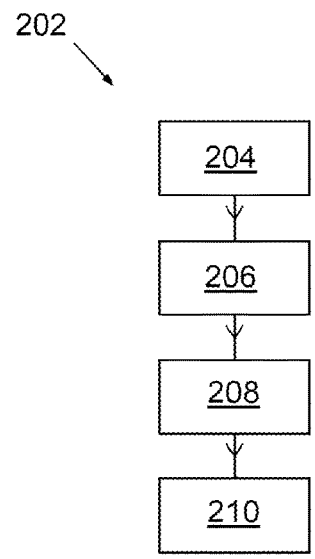
FIG. 4 is a flow diagram of a first embodiment of a method for transparent on-board routing of data packets at very high bit rate according to the invention, implemented by the telecommunication systems described in FIGS. 1 to 3.

According to FIG. 4 and a first embodiment of the invention of the on-board routing method according to the invention, a method for transparent on-board routing 202 of data packets at high bit rate according to the invention, implemented by a satellite telecommunication system 2, 52, 102 as described in FIGS. 1 to 3 or a similar telecommunication system, comprises first, second, third steps, 204, 206, 208, 210 executed in succession.

In the first step 204, the origin transmitting station segments high bit rate data streams received into uncoded packets of large size each having the structure of an uncoded baseband frame BBFRAME as defined by the DVB-S2 protocol and in which a data field is reserved in the header and in the payload of the uncoded BBFRAME packet to receive an on-board routing label of a single piece, containing an identifier of the destination receiving station associated with said uncoded BBFRAME packet.

Then, in the second step 206, the origin transmitting station inserts, into the routing label, an identifier of the destination receiving station associated with said uncoded BBFRAME packet, codes the uncoded BBFRAME packet as a coded BBFRAME packet, and transmits the coded BBFRAME packet to the first satellite, configured as origin satellite, on a same data stream.

The coded BBFRAME packet is transmitted by being modulated by one and the same predetermined modulation, defined according to the DVB-S2 protocol and compatible with the code used for the DVB-S2 packet.

Next, in the third step 208, the first origin satellite receives, demodulates and decodes each coded BBFRAME packet, transmitted by the origin transmitting station in the second step 206, and extracts from the on-board routing label the information identifying the destination receiving station to route, transparently using the space network, the decoded BBFRAME packet to the destination satellite corresponding to the destination receiving station of the uncoded BBFRAME packet.

Then, in the fourth step 210, the destination satellite corresponding to the destination receiving station of the decoded BBFRAME packet, transmits a coded BBFRAME packet corresponding to the uncoded BBFRAME packet by coding the uncoded BBFRAME packet and by modulating it through a code and a modulation that are predetermined and defined according to the DVB-S2 protocol.

Figure 5:
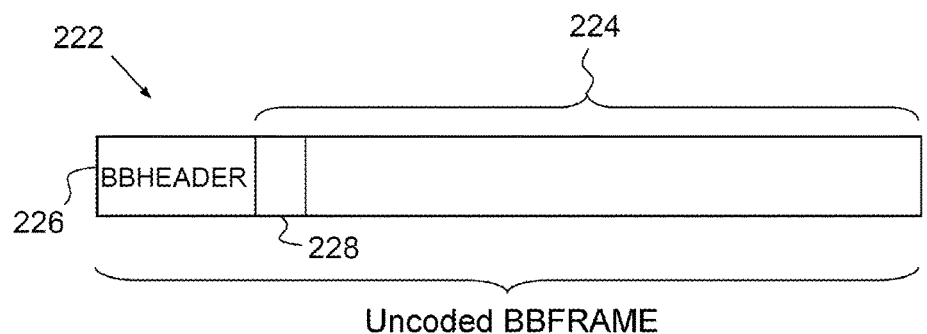
FIG. 5 is a view of the BBFRAME frame of an uncoded packet, generated during the on-board routing method according to the first embodiment of the invention of FIG. 4.

According to FIG. 5, the structure of an uncoded BBFRAME packet 222 is represented. The uncoded BBFRAME packet 222 comprises, as defined by the DVB-S2 protocol, a payload data field 224 and a DVB-S2 overhead field 226. Here, a data field 228 is reserved at the start of the payload field 224 for the routing label used upon the implementation of the transparent on-board routing method 202 according to the invention.

Figure 6:
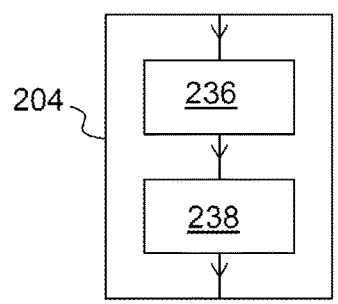
FIG. 6 is a detailed flow diagram view of an exemplary embodiment of the first step of the transparent on-board routing method of FIG. 4.

According to FIG. 6, the first step 204 of the on-board routing method of FIG. 4 comprises a fourth step 236 and a fifth step 238, executed in succession.

The fourth step 236 consists in the origin transmitting station segmenting high bit rate data streams received into uncoded BBFRAME packets each having the structure of a baseband frame before coding as defined in the DVB-S2 protocol.

The fifth step 238 consists in the origin transmitting station switching, according to their associated destination receiving station, the uncoded BBFRAME packets whose associated destination receiving stations are the first destination receiving station and/or the second destination receiving station on a first queue defining a first logical channel associated with the first destination receiving station and a second queue defining a first logical channel associated with the second destination receiving station.

Figure 7:
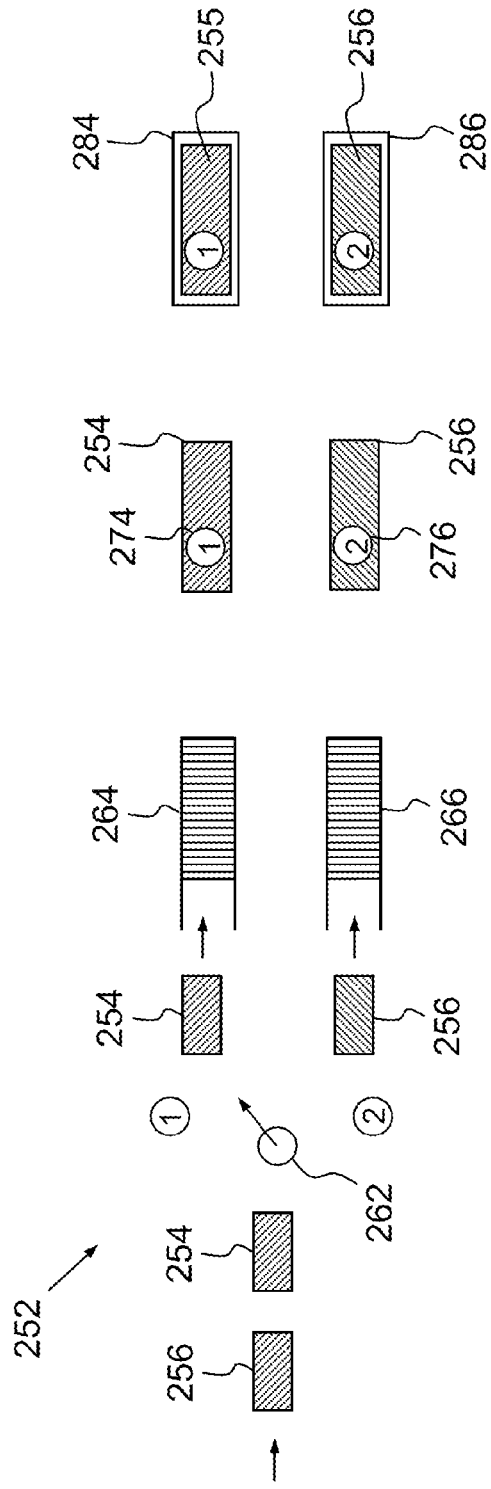
FIG. 7 is a view of a particular example of implementation, in the origin transmitting station of the telecommunication system of FIGS. 1 to 3, of the first step of FIG. 4 of the transparent routing method of FIG. 4.

According to FIG. 7 and an example of implementation, in the origin transmitting station 4, 54, 104, of the first step 204 described in FIG. 6, the first origin station comprises one or more electronic computers 252, generic and/or specialized, programmed to implement the fourth step 236 and an exemplary embodiment of the fifth step 238.

At least one high bit rate data stream, supplied at the input port 142 of the origin transmitting station, is segmented in the fourth step 236 into uncoded BBFRAME packets 254, 256 each having the structure of a baseband frame BBFRAME before coding as defined in the DVB-S2 protocol. Here, only two uncoded BBFRAME packets 254, 256 are represented, each by a rectangle having a different shading pattern. According to FIG. 7, the first uncoded BBFRAME packet 254 is represented by a first right-leaning shading pattern whereas the second uncoded BBFRAME packet 256 is represented by a second left-leaning shading pattern. Then, the first and second uncoded BBFRAME packets 254, 256 are switched by a switching device 262 on a first queue 264 and a second queue 266. The first queue 264, produced for example by a first buffer memory, is reserved exclusively for the uncoded BBFRAME packets, intended exclusively for the first destination receiving station, whereas the second queue 266, produced here by a second buffer memory, is reserved exclusively for the uncoded BBFRAME packets, intended exclusively for the second destination receiving station.

Next, when the first uncoded BBFRAME packet 254 leaves the first queue 264, a first on-board routing label 274, containing an identifier of the first destination receiving station of the first uncoded packet 254, is here included in and at the start of a reserved data field of the payload of said first uncoded BBFRAME packet 254. Then, the first uncoded BBFRAME packet 254 of which the payload has been completed is coded as a coded BBFRAME frame or FECFRAME 284 by the use of a parameterized coding as defined in the DVB-S2 protocol.

In parallel, when the second uncoded BBFRAME packet 256 leaves the second queue 266, a second on-board routing label 276, containing an identifier of the second destination receiving station of the second coded packet 256, is here included in and at the start of a reserved data field of the payload of said second uncoded BBFRAME packet 256. Then, the second uncoded BBFRAME packet 256 for which the payload has been completed is coded as a coded BBFRAME frame or FECFRAME 286 by the use of a parameterized coding as defined in the DVB-S2 protocol.

Figure 8:
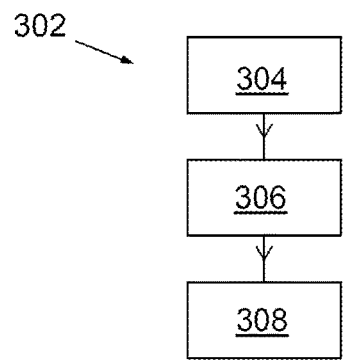
FIG. 8 is a flow diagram of a second embodiment of a method for transparent on-board routing of data packets at very high bit rate according to the invention, implemented by the configurations of the telecommunication system described in FIGS. 1 to 3.

According to FIG. 8 and a second embodiment of the transparent on-board routing method according to the invention, a method for transparent on-board routing 302 of data packets at high bit rate, implemented by a satellite telecommunication system 2, 52, 102 as described in FIGS. 1 to 3 or a similar telecommunication system, comprises first, second, third steps, 304, 306, 308, executed in succession.

In the first step 304, the origin transmitting station segments and codes high bit rate data streams received as coded packets of large size each having the structure of a coded baseband frame BBFRAME as defined by the DVB-S2 protocol and an associated destination receiving station, out of the first destination receiving station and the second destination receiving station.

Then, in a second step 306, the first destination transmitting station adds the on-board routing label associated with said coded BBFRAME packet and transmits the assembly formed by the coded BBFRAME packet and its associated on-board routing label to the first satellite, configured as origin satellite, on a same data stream.

The on-board routing label associated with said coded BBFRAME packet contains an identifier of the destination receiving station associated with said coded BBFRAME packet.

The coded BBFRAME packet and the respectively associated on-board routing label 162, 164 of a single piece are transmitted grouped together by being modulated by one and the same predetermined modulation, defined according to the DVB-S2 protocol and compatible with the code used for the DVB-S2 packet.

Next, in the third step 308, the first origin satellite receives and demodulates each coded BBFRAME packet and its corresponding added label, transmitted by the origin transmitting station in the second step 306, and extracts from the on-board routing label the information identifying the destination receiving station to route, transparently using the space network 32, 72 or the internal router 132, the coded BBFRAME packet to the destination satellite corresponding to the destination receiving station of the coded BBFRAME packet.

Figure 9:
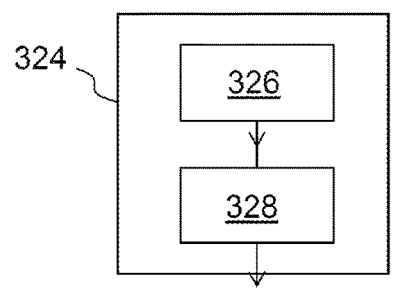
FIG. 9 is a detailed flow diagram of an exemplary embodiment of the first step of the transparent on-board routing method of FIG. 8.

According to FIG. 9 and a particular embodiment 324 of the first step 304 of FIG. 8, the first step 324 comprises a fourth step 326 and a fifth step 328, executed in succession.

The fourth step 326 consists in that the origin transmitting station segments high bit rate data streams received into uncoded BBFRAME packets of large size each having the structure of a baseband frame before coding as defined in the DVB-S2 protocol.

The fifth step 328 consists in that the origin transmitting station:

either codes the uncoded BBFRAME packets as coded BBFRAME packets, then switches, according to their associated destination receiving station, the coded BBFRAME packets whose associated destination receiving stations are the first destination receiving station and/or the second destination receiving station on a first queue defining a first logical channel associated with the first destination receiving station and a second queue defining a first logical channel associated with the second destination receiving station;

or switches, according to their associated destination receiving station, the uncoded BBFRAME packets whose associated destination receiving stations are the first destination receiving station and/or the second destination receiving station on a first queue defining a first logical channel associated with the first destination receiving station and a second queue defining a first logical channel associated with the second destination receiving station, then, at the output of each queue, codes the uncoded BBFRAME packets as coded BBFRAME packets.

The addition of the on-board routing labels to the coded BBFRAME packets is performed at the output of the queues and the content of the label depends on the output queue.

The coding of the BBFRAME packets as coded BBFRAME packets is a coding as defined in the DVB-S2 protocol, parameterizable according to an MODCOD control vector, supplied and defined in the same DVB-S2 protocol.

Figure 10:
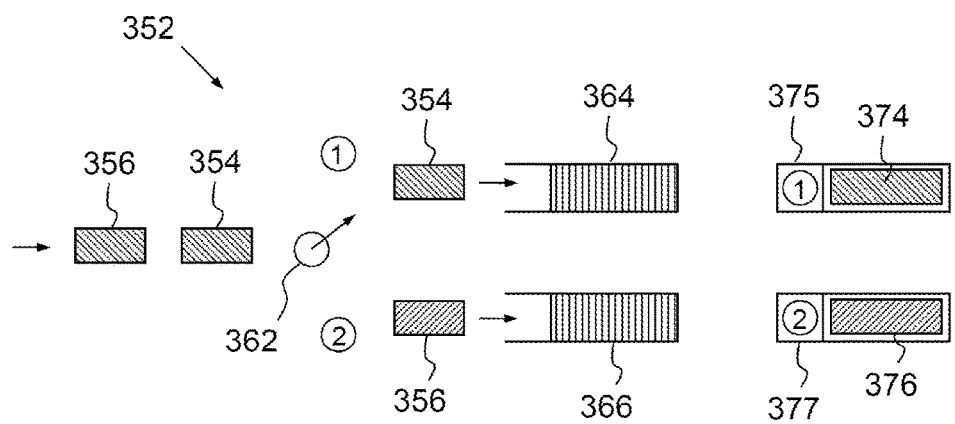
FIG. 10 is a view of a particular example of implementation, in the origin transmitting station of the telecommunication system of FIGS. 1 to 3, of the first step of FIG. 9 of the transparent routing method of FIG. 8.

According to FIG. 10, and an example of implementation, in the origin transmitting station 4, 54, 104, of the first step 324 described in FIG. 7, the first origin station comprises one or more electronic computers 352, generic and/or specialized, programmed to implement the fourth step 326 and an exemplary embodiment of the fifth step 328.

At least one high bit rate data stream, supplied at the input port of the origin transmitting station, is segmented in the fourth step 326 into uncoded BBFRAME packets 354, 356 each having the structure of a baseband frame BBFRAME before coding as defined in the DVB-S2 protocol. Here, only two uncoded BBFRAME packets 354, 356 are represented, each by a rectangle having a different shading pattern. According to FIG. 10, the first uncoded BBFRAME packet 354 is represented by a first right-leaning shading pattern whereas the second uncoded BBFRAME packet 356 is represented by a second left-leaning shading pattern. Then, the first and second uncoded BBFRAME packets 354, 356 are switched by a switching device 362 on a first queue 364 and a second queue 366. The first queue 364, produced for example by a first buffer memory, is reserved exclusively for the uncoded BBFRAME packets intended exclusively for the first destination receiving station, whereas the second queue 366, produced here by a second buffer memory, is reserved exclusively for the uncoded BBFRAME packets intended exclusively for the second destination receiving station.

Next, when the first uncoded BBFRAME packet 354 leaves the first queue 364, said first uncoded packet 354 is coded as a first coded BBFRAME packet or FECFRAME 374 by the use of a coding parameterized as defined in the DVB-S2 protocol. Then, a first on-board routing label 375, containing an identifier of the first destination receiving station of the first coded packet 374, is here added immediately in the header of said first coded packet.

In parallel, when the second uncoded BBFRAME packet 356 leaves the second queue 366, said second uncoded packet 356 is coded as a second coded BBFRAME packet 376 by the use of the same parameterized coding as defined in the DVB-S2 protocol as that applied for the first uncoded BBFRAME packet 354. Then, a second on-board routing label 377, containing an identifier of the second destination receiving station of the second coded packet 376, is here added immediately in the header of said second coded packet.

As described in FIG. 9, another mode of implementation of the fourth and fifth steps is possible in which the uncoded BBFRAME packets are first of all switched into the queues, then coded at the output of the queues.

Furthermore, the added transparent on-board routing label is placed in the header, or at the end of a coded BBFRAME packet, or inserted in the coded BBFRAME packet at a predetermined fixed binary rank.

Figure 11A:
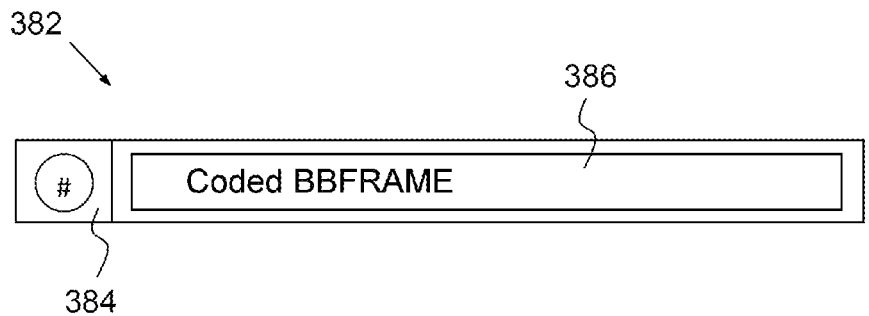
FIGS. 11A, 11B and 11C are three different embodiments of association of an on-board routing label and of a coded packet according to the DVB-S2 standard, the on-board routing label being that used by the transparent on-board routing method of FIG. 8.

According to FIG. 11A and a first configuration 382, a transparent on-board routing label 384 is added in the header of a coded BBFRAME packet 386.

Figure 11B:
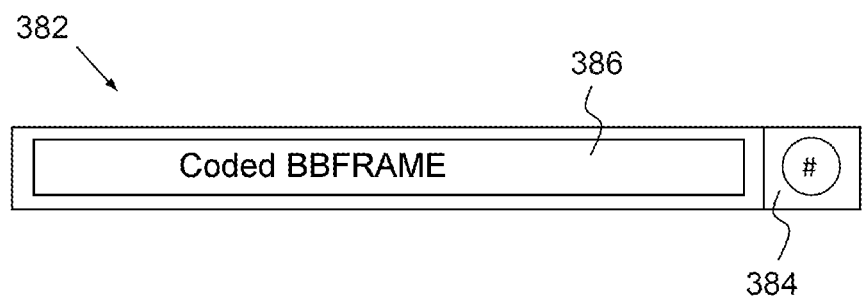

According to FIG. 11B and a second configuration 392, the transparent on-board routing label 384 is added at the end of the coded BBFRAME packet 386.

Figure 11C:
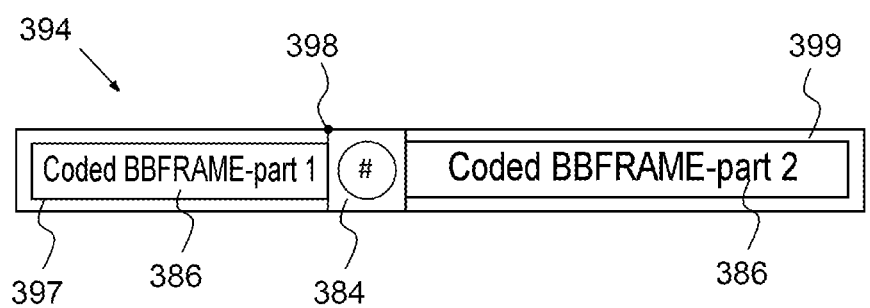

According to FIG. 11C and a third configuration 394, the transparent on-board routing label 384 is added and inserted in the coded BBFRAME packet 386 at a level 398 of said coded packet 386, divided into two portions 397 and 399, the level 386 being identified by a predetermined fixed binary rank, denoted by i and corresponding to the rank of the first bit of the on-board routing label following the binary rank of the last bit i−1 of the first portion 397 of the coded packet 396.

For example, the added on-board routing label is or includes a label defined according to the MPLS ("Multi-Protocol Label Switching") protocol or a label defined according to the Ethernet VLAN protocol or a PLHEADER label.

Figure 12:
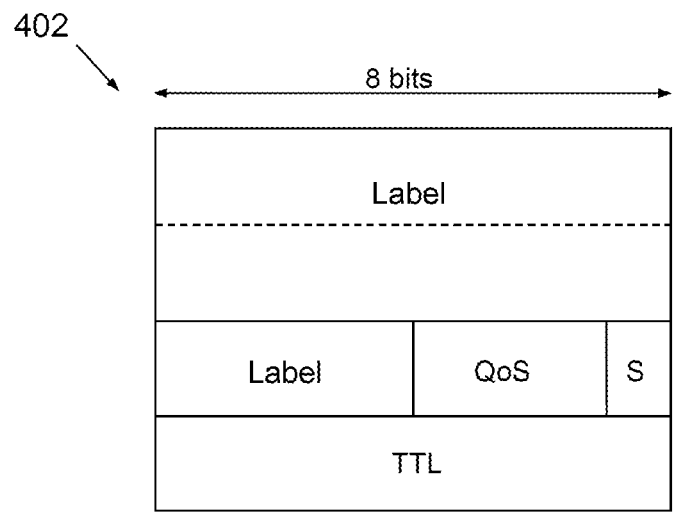
FIG. 12 is a view of a format of an on-board routing label used by the transparent on-board routing methods of FIGS. 4 and 8, when the on-board routing label is an MPLS ("Multi-Protocol Label Switching") label defined according to the IETF ("Internet Engineering Task Force") standard.

According to FIG. 12, the standardized format of a label 402 of MPLS type is reviewed. This conventional format allows for an easy switching of the packets and also facilitates interconnection with the ground networks. This label also makes it possible to introduce quality of service QoS processing operations to differentiate the traffic conveyed. It thus becomes possible to use G-MPLS for the control of labels, as is done in the terrestrial networks.

In a variant, the added on-board switching labels comprise additional information for implementing an end-to-end adaptive code and modulation (ACM) function. In this case, the additional information typically comprises one or more first measurements of a first signal-to-noise-plus-interference ratio SNIR of the uplink from the transmitting station to the origin satellite, one or more second measurements of second signal-to-noise-plus-interference ratios of the downlinks from the destination receiving stations to the origin transmitting station.

In another variant, the on-board switching labels comprise additional information such as a numbering for a rescheduling, in the form for example of a sequence number on one or two bytes according to the bit rates.

Even though the use of an on-board routing label is possible, preferably, the transparent on-board routing label, added by the origin transmitting station, is coded by a coding dedicated exclusively to the label at a fixed rate, independent of the transmitting station and of the receiving stations. For example, because of the small size of the added on-board label, the coding of the label will be able to be a repeat coding of the label, associated with a majority vote decoding.

Figures 13A, 13B:
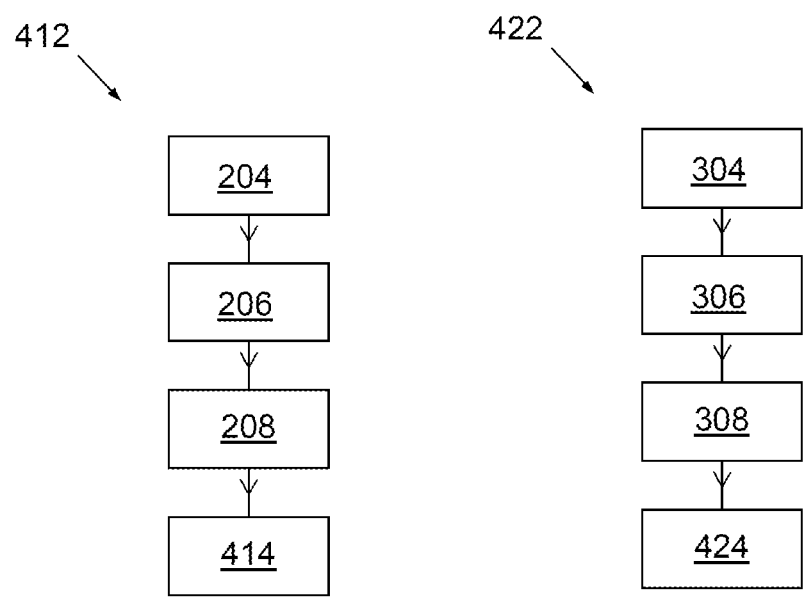
FIGS. 13A and 13B are flow diagrams of a variant of the respective transparent on-board routing methods of FIGS. 4 and 8, in which an additional step complements the respective third steps.

According to FIG. 13A and a particular variant embodiment of the on-board routing method of FIG. 4, an on-board routing method 412 comprises the first, second and third steps 204, 206, 208 of FIG. 4, and a sixth step 414, executed after the third step 208.

During the sixth step 414, the first origin satellite generates on-board routing or on-board switching information for the coded data packet on the basis of the information identifying the destination receiving station and predetermined signalling information. The predetermined signalling information concerns the optimized transit paths for the packet which can be used within the space network between the origin satellite and the relevant destination satellite or within the internal router of a single origin-destination satellite. During this same step 414, on-board routing information for the coded data packet is encoded in a dedicated data field of the on-board switching label according to a predetermined protocol, dedicated to the space network when there is such a space network.

According to FIG. 13B and a particular variant embodiment of the on-board routing method of FIG. 8, an on-board routing method 422 comprises the first, second and third steps 304, 306, 308 of FIG. 8, and a sixth step 424, executed after the third step 308.

During the sixth step 424, the first origin satellite generates on-board routing or on-board switching information for the coded data packet on the basis of the information identifying the destination receiving station and predetermined signalling information. The predetermined signalling information concerns the optimized transit paths for the packet which can be used within the space network between the origin satellite and the relevant destination satellite or within the internal router of a single origin-destination satellite. During this same step 424, on-board routing information for the coded data packet is encoded in a dedicated data field of the on-board switching label according to a predetermined protocol, dedicated to the space network when there is such a space network.

Figure 14:
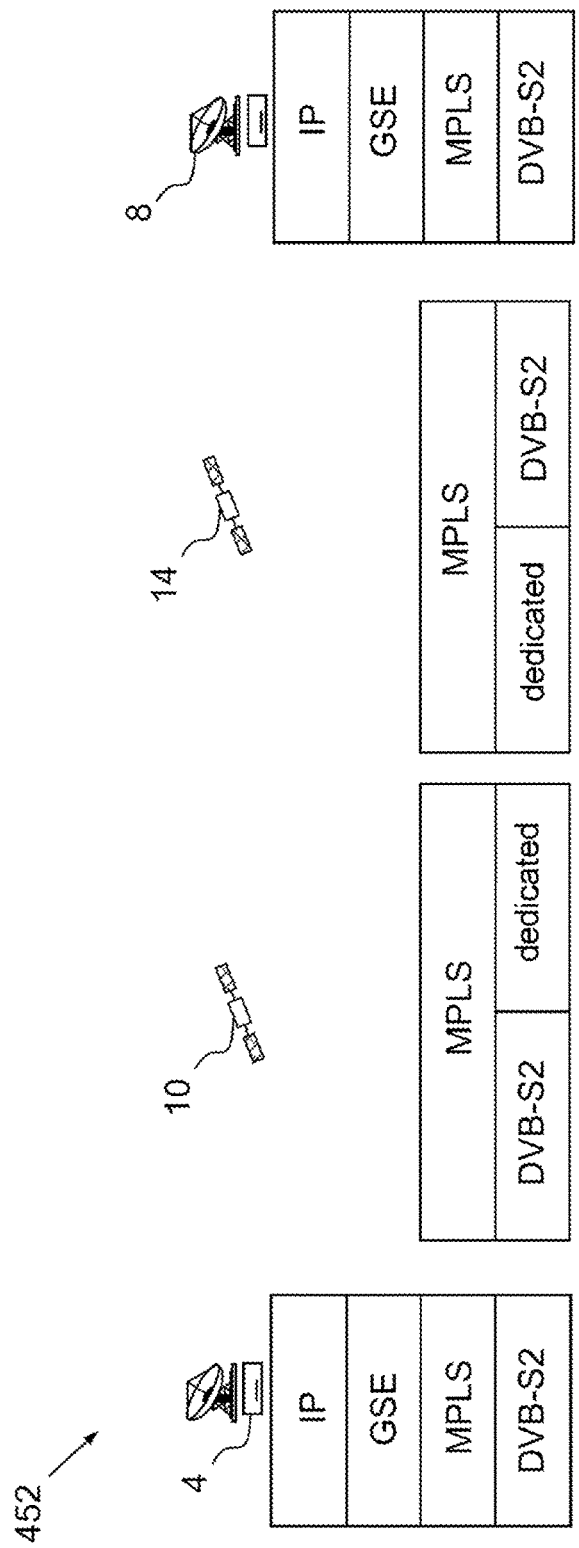
FIG. 14 is a protocol stack according to an OSI ("Open Systems Interconnection") representation of a method for transferring IP data packets at high bit rate from a transmitting station to a receiving station, the transfer method using the methods for transparent on-board routing of data packets at very high bit rate according to the invention of FIGS. 4 and 8.

According to FIG. 14, a protocol stack 452 of a method for transferring IP data packets at high bit rate from the transmitting station 4 to the destination receiving station 8 is provided according to an OSI representation. The transfer method 452 here uses the method for transparent on-board routing 202 of data packets at very high bit rate defined according to the first embodiment of FIG. 4.

Here, particularly and in a nonlimiting manner, each BBFRAME packet before coding comprises, in its payload, one or more GSE packets defined according to the GSE protocol, which encapsulate IP packets.

The use of a transparent on-board routing method described above among the first and second receiving stations can be generalized to a number of destination receiving stations greater than or equal to three.

In this case, the telecommunication system further comprises at least one additional destination receiving station and one additional satellite. The additional satellite is different from the second and third destination satellites, and configured as a destination satellite with respect to the destination receiving station. The additional satellite is connected directly to the additional destination receiving station by an additional radiofrequency downlink from the additional destination satellite. The first origin satellite, the second, third destination satellites and the at least one additional destination satellite are interconnected with one another by the space network which has inter-satellite links and possible relay satellites in appropriate numbers. In the case of this generalization, and independently of the embodiment chosen, the list of the identifiers of the destination receiving stations as relevant information of the transparent on-board routing label, is widened to include therein the additional destination receiving station.

The use of a transparent on-board routing method 202 according to the first embodiment in the transfer method 452 of FIG. 14 can be extended to the use of a transparent on-board routing method 402 according to the second embodiment.

Generally, a transparent on-board routing method according to the invention is characterized in that:

the origin transmitting station segments high bit rate data streams received into coded or uncoded packets each having the structure of a coded or uncoded baseband frame BBFRAME as defined by the DVB-S2 protocol; and the origin transmitting station inserts, for each segmented BBFRAME packet, coded or uncoded, a routing label of a single piece respectively associated with said coded or uncoded BBFRAME packet, by including the routing label in and at the start of a payload data field of said BBFRAME packet when the BBFRAME packet is uncoded, or by externally adding the routing label to said BBFRAME packet when the BBFRAME packet is coded.

The on-board routing label associated with said coded or uncoded BBFRAME packet containing an identifier of the destination receiving station associated with said coded BBFRAME packet, out of the first destination receiving station and the second destination receiving station.

Given the size of the BBFRAME packets (64800 coded bits) this makes it possible to significantly reduce the number of packets to be processed onboard.

This transparent on-board routing method makes it possible to considerably reduce the processing operations to be performed onboard for the switching, and makes it possible to make a regenerative solution viable for the bit rates considered.

The typical sizes of the IP packets are 40 and 1500 bytes. Table 1 below summarizes the number of packets per BBFRAME according to the coding rate used. Four traffic scenarios are considered:
- 100% of packets with a size of 40 bytes
- 100% of packets with a size of 1500 bytes
- 50% of packets with a size of 40 bytes and 50% of packets with a size of 1500 bytes
- 50% of bit rate corresponding to packets with a size of 40 bytes and 50% of bit rate corresponding to packets with a size of 1500 bytes.

TABLE 1

|  | 40 bytes | 1500 bytes | 50%-50% Mix (number) | 50%-50% Mix (bit rate) |
| --- | --- | --- | --- | --- |
| 1/4 coding | 50 packets | 2 packets | 3 packets | 25 packets |
| 8/9 coding | 180 packets | 5 packets | 10 packets | 90 packets |
| 5/6 coding | 170 packets | 5 packets | 9 packets | 84 packets |

The operation of the switching matrix being directly linked to the number of packets to be transmitted, the saving provided by the switching of the DVB-S2 frame in terms of onboard processing is therefore:

TABLE 2

|  | 40 bytes | 1500 bytes | 50%-50% Mix (number) | 50%-50% Mix (bit rate) |
| --- | --- | --- | --- | --- |
| 1/4 coding | 4900% | 100% | 200% | 2400% |
| 8/9 coding | 17900% | 400% | 900% | 8900% |
| 5/6 coding | 16900% | 400% | 800% | 8500% |

To sum up, the transparent on-board routing method according to the invention allows for a reduction of the switching complexity by a factor of 10 to 90 for typical cases.

Furthermore, the method according to the invention avoids the use of onboard segmentation/reassembly or concatenation techniques which are computing resource intensive. Finally, the sizes of packets are variable but only a limited size subset is to be considered (dependent on the coding rate only).

The use of a label inserted on the ground also makes it possible to simplify the interconnection with the ground networks and to introduce service-differentiated QoS processing operations.

It should be noted that, in the above description text, an uncoded BBFRAME packet and a coded BBFRAME packet are respectively designated by BBFRAME and FEC-FRAME in the ETSI DVB-S2 standard document, bearing the ETSI reference number EN 302 307-1 and entitled "Digital Video Broadcasting (DVB), Second generation framing structure; channel coding and modulation systems for Broadcasting, Interactive Services; News Gathering and other broadband satellite applications; Part 1: DVB-S2". The structure of the respective frames of the uncoded BBFRAME packet and of the coded BBFRAME packet is described in this same document.

The invention claimed is:

1. A method for transparent on-board routing of data packets at high bit rate, implemented by a satellite telecommunication system, the satellite telecommunication system comprising
an origin transmitting station, a first destination receiving station, a second destination receiving station, and a plurality of satellites; and
a first radiofrequency uplink which connects the origin transmitting station to a first satellite of the plurality of satellites, configured as an origin satellite with respect to the origin transmitting station;
a second radiofrequency downlink which connects, in a first configuration, the first destination receiving station to a second satellite of the plurality of satellites, configured as a first destination satellite with respect to the first destination receiving station, or which connects, in a second configuration and a third configuration, the first destination receiving station to the first satellite, configured as a first destination satellite with respect to the first destination receiving station;
a third radiofrequency downlink, which connects, in the first configuration, the second destination receiving station to a third satellite of the plurality of satellites, configured as a second destination satellite with respect to the second destination receiving station, or which connects, in the second configuration, the second destination receiving station to a second satellite of the plurality of satellites, configured as a second destination satellite with respect to the second destination receiving station, or which connects, in the third configuration, the second destination receiving station to the first satellite, configured as a second destination satellite with respect to the second destination receiving station;
the first, second and third satellites of the first configuration, or the first and second satellites of the second configuration being interconnected with one another by a space network comprising at least two or at least one inter-satellite link(s), and the first satellite of the third configuration comprising an internal router;
the transparent on-board routing method wherein:
the origin transmitting station segments high bit rate data streams received into coded or uncoded BBFRAME packets each having the structure of a coded or uncoded baseband frame BBFRAME as defined by the DVB-S2 protocol; and
the origin transmitting station inserts, for each BBFRAME packet, coded or uncoded, an on-board routing label of a single piece respectively associated with said coded or uncoded BBFRAME packet,
by including the on-board routing label in and at the start of a payload data field of said BBFRAME packet when the BBFRAME packet is uncoded, or
by externally adding the on-board routing label to said BBFRAME packet when the BBFRAME packet is coded;
the on-board routing label associated with said coded or uncoded BBFRAME packet containing an identifier of the destination receiving station associated with said coded BBFRAME packet, out of the first destination receiving station and the second destination receiving station; and the first origin satellite extracts from the on-board routing label information identifying the destination receiving station to route, transparently using the space network, the decoded BBFRAME packet, the coded BBFRAME packet respectively, to the destination satellite corresponding to the destination receiving station of the uncoded BBFRAME packet, the coded BBFRAME packet respectively.

2. The method for transparent on-board routing of data packets at high bit rate according to claim 1, comprising the steps wherein:

in a first step, the origin transmitting station segments high bit rate data streams received into uncoded BBFRAME packets of large size each having the structure of an uncoded baseband frame BBFRAME as defined by the DVB-S2 protocol and in which a data field is reserved in the header and in the payload of the uncoded BBFRAME packet to receive an on-board routing label of an associated single piece, containing an identifier of the destination receiving station associated with said uncoded BBFRAME packet; then in a second step, the origin transmitting station inserts, into the routing label, an identifier of the destination receiving station associated with said uncoded BBFRAME packet, codes the completed uncoded BBFRAME packet as a coded BBFRAME packet, and transmits the coded BBFRAME packet to the first satellite, configured as origin satellite, the coded BBFRAME packet transmitted being modulated by a predetermined modulation, defined according to the DVB-S2 protocol and compatible with the code used for the DVB-S2 packet; then in a third step, the first origin satellite receives, demodulates and decodes each coded BBFRAME packet, transmitted by the origin transmitting station in the second step, and extracts from the on-board routing label the information identifying the destination receiving station to route, transparently using the space network, the decoded BBFRAME packet to the destination satellite corresponding to the destination receiving station of the uncoded BBFRAME packet.

3. The method for transparent on-board routing of data packets at high bit rate according to claim 2, wherein the first step comprises a fourth step and a fifth step executed in succession, the fourth step consisting in the origin transmitting station segmenting high bit rate data streams received into uncoded BBFRAME packets each having the structure of a baseband frame before coding as defined in the DVB-S2 protocol;

the fifth step consisting in the origin transmitting station switching, according to their associated destination receiving station, the uncoded BBFRAME packets whose associated destination receiving stations are the first destination receiving station and/or the second destination receiving station on a first queue defining a first logical channel associated with the first destination receiving station and a second queue defining a first logical channel associated with the second destination receiving station.

4. The method for transparent on-board routing of data packets at high bit rate according to claim 1, comprising the steps wherein:

in a first step, the origin transmitting station segments and codes high bit rate data streams received as coded BBFRAME packets each having the structure of a coded baseband frame BBFRAME as defined by the DVB-S2 protocol and having an associated destination receiving station out of the first destination receiving station and the second destination receiving station; then in a second step, the origin transmitting station adds the on-board routing label associated with said BBFRAME packet coded and formed in the first step to said coded BBFRAME packet, and transmits the assembly formed by the coded BBFRAME packet and its associated on-board routing label to the first satellite configured as the origin satellite, the coded BBFRAME packet and the respectively associated label of a single piece, transmitted grouped together, being modulated by one and the same modulation defined according to the DVB-S2 protocol and compatible with the code used for the coded DVB-S2 packet; then in a third step, the first origin satellite receives and demodulates each coded BBFRAME packet and its corresponding added label transmitted by the first transmitting station in the second step, and extracts from the on-board routing label the information identifying the destination receiving station to route, transparently using the space network, the coded BBFRAME packet to the destination satellite corresponding to the destination receiving station of the coded BBFRAME packet.

5. The method for transparent on-board routing of data packets at high bit rate according to claim 4, wherein the first step comprises a fourth step and a fifth step executed in succession, the fourth step wherein the origin transmitting station segments high bit rate data streams received into uncoded BBFRAME packets each having the structure of a baseband frame before coding as defined in the DVB-S2 protocol;

the fifth step wherein the origin transmitting station either codes the uncoded BBFRAME packets as coded BBFRAME packets then switches, according to their associated destination receiving station, the coded BBFRAME packets whose associated destination receiving stations are the first destination receiving station and/or the second destination receiving station on a first queue defining a first logical channel associated with the first destination receiving station and a second queue defining a first logical channel associated with the second destination receiving station, or switches, according to their associated destination receiving station, the uncoded BBFRAME packets whose associated destination receiving stations are the first destination receiving station and/or the second destination receiving station on a first queue defining a first logical channel associated with the first destination receiving station and a second queue defining a first logical channel associated with the second destination receiving station, then, at the output of each queue, codes the uncoded BBFRAME packets as coded BBFRAME packets.

6. The method for transparent on-board routing of data packets at high bit rate according to claim 4, wherein the on-board routing label added is coded by a coding dedicated exclusively to the label at a fixed rate, independent of the transmitting station and of the receiving stations.

7. The method for transparent on-board routing of data packets at high bit rate according to claim 2, further comprising a sixth step, executed after the third step, during which the first origin satellite generates routing information for the coded or uncoded BBFRAME packet on the basis of the information identifying the destination receiving station and predetermined signalling information concerning optimized transit paths for the data packet, that can be used within the space network between the origin satellite and the relevant destination satellite or within the internal router, and encodes it in a dedicated data field of the routing label according to a predetermined protocol, dedicated to the space network or to the internal router.

8. The method for transparent on-board routing of data packets at high bit rate according to claim 1, wherein the on-board routing label is or includes a label defined according to the MPLS ("Multi-Protocol Label Switching") protocol or a label defined according to the Ethernet VLAN protocol or a PLHEADER label.

9. The method for transparent on-board routing of data packets at high bit rate according to claim 1, wherein the on-board routing label comprises additional information included in the set formed by a first measurement of a first signal-to-noise-plus-interference ratio of the uplink from the transmitting station to the origin satellite, second measurements of second signal-to-noise-plus-interference ratios of the downlinks from the destination receiving stations to the transmitting station and numbers of a numbering system for a rescheduling.

10. The method for transparent on-board routing of data packets at high bit rate according to claim 1, wherein each BBFRAME packet before coding comprises one or more GSE packets defined according to the GSE protocol.

11. The method for transparent on-board routing of data packets at high bit rate according to claim 1, wherein
the telecommunication system further comprises at least one additional destination receiving station and one additional satellite,
the additional satellite being different from the second and third destination satellites, configured as a destination satellite with respect to the destination receiving station, and connected directly to the additional destination receiving station by an additional radiofrequency downlink from the additional destination satellite;
the first origin satellite, the second, third destination satellites and the at least one additional destination satellite being interconnected with one another by the space network; and wherein
the origin transmitting station segments high bit rate data streams received into coded or uncoded BBFRAME packets, the coded or uncoded BBFRAME packets each having the structure of a coded or uncoded baseband frame BBFRAME as defined by the DVB-S2 protocol and an associated destination receiving station out of the second destination receiving station, the third destination receiving station and the at least one additional destination receiving station.

12. A satellite telecommunication system for supplying high bit rate telecommunication services comprising
an origin transmitting station, a first destination receiving station, a second destination receiving station, and a plurality of satellites; and
a first radiofrequency uplink which connects the origin transmitting station to a first satellite of the plurality of satellites, configured as an origin satellite with respect to the origin transmitting station;
a second radiofrequency downlink which connects, in a first configuration, the first destination receiving station to a second satellite of the plurality of satellites, configured as a first destination satellite with respect to the first destination receiving station, or which connects, in a second configuration and a third configuration, the first destination receiving station to the first satellite, configured as a first destination satellite with respect to the first destination receiving station;
a third radiofrequency downlink which connects, in the first configuration, the second destination receiving station to a third satellite of the plurality of satellites, configured as a second destination satellite with respect to the second destination receiving station, or which connects, in the second configuration, the second destination receiving station to a second satellite of the plurality of satellites, configured as a second destination satellite with respect to the second destination receiving station, or which connects, in the third configuration, the second destination receiving station to the first satellite, configured as a second destination satellite with respect to the second destination receiving station;
the first, second and third satellites of the first configuration or the first and second satellites of the second configuration being interconnected with one another by a space network comprising at least two or at least one inter-satellite link(s), and the first satellite of the third configuration comprising an internal router;
the satellite telecommunication system wherein
the origin transmitting station is configured to
in a first step, segment and code high bit rate data streams received as coded BBFRAME packets each having the structure of a coded baseband frame BBFRAME as defined by the DVB-S2 protocol and an associated destination receiving station out of the first destination receiving station and the second destination receiving station; then
in a second step, add, to said BBFRAME packet coded and formed in the first step, an associated on-board routing label, and transmit the assembly formed by the BBFRAME packet and its associated on-board routing label to the first satellite configured as origin satellite,
the on-board routing label associated with said coded BBFRAME packet containing an identifier of the destination receiving station associated with said coded BBFRAME packet, and the coded BBFRAME packet and the respectively associated on-board routing label of a single piece, transmitted grouped together, being modulated by one and the same modulation defined according to the DVB-S2 protocol and compatible with the code used for the DVB-S2 packet; and
the first origin satellite is configured to
in a third step, receive and demodulate each coded BBFRAME packet and its corresponding added on-board routing label, transmitted by the origin transmitting station in the second step, and extract from the on-board routing label the information identifying the destination receiving station to route, transparently using the space network, the coded BBFRAME packet to the destination satellite corresponding to the destination receiving station of the coded BBFRAME packet.

13. The satellite telecommunication system according to claim 12, wherein
the first origin transmitting station is configured to in a fourth step included in the first step, segment the high bit rate data streams received into uncoded BBFRAME packets each having the structure of a baseband frame before coding as defined in the DVB-S2 protocol; then in a fifth step, following the fourth step, either code the uncoded BBFRAME packets as coded BBFRAME packets then switch, according to their associated destination receiving station, the coded BBFRAME packets whose associated destination receiving stations are the first destination receiving station and/or the second destination receiving station, on a first queue defining a first logical channel associated with the first destination receiving station and a second queue defining a first logical channel associated with the second destination receiving station, or switch, according to their associated destination receiving station, the uncoded BBFRAME packets whose associated destination receiving stations are the first destination receiving station and/or the second destination receiving station on a first queue defining a first logical channel associated with the first destination receiving station and a second queue defining a first logical channel associated with the second destination receiving station, then, at the output of each queue, code the uncoded BBFRAME packets as coded BBFRAME packets.

14. A computer product or program comprising a set of instructions, configured to implement a method for transparent on-board routing of data packets at high bit rate, when said instructions are loaded into and executed by one or more computers implemented in the satellite telecommunication system, defined to claim 12.

15. The satellite telecommunication system for supplying high bit rate telecommunication services, comprising an origin transmitting station, a first destination receiving station, a second destination receiving station, and a plurality of satellites; and a first radiofrequency uplink which connects the origin transmitting station to a first satellite of the plurality of satellites, configured as an origin satellite with respect to the origin transmitting station;

a second radiofrequency downlink which connects, in a first configuration, the first destination receiving station to a second satellite of the plurality of satellites, configured as a first destination satellite with respect to the first destination receiving station, or which connects, in a second configuration and a third configuration, the first destination receiving station to the first satellite, configured as a first destination satellite with respect to the first destination receiving station;

a third radiofrequency downlink which connects, in the first configuration, the second destination receiving station to a third satellite of the plurality of satellites, configured as a second destination satellite with respect to the second destination receiving station, or which connects, in the second configuration, the second destination receiving station to a second satellite of the plurality of satellites, configured as a second destination satellite with respect to the second destination receiving station, or which connects, in the third configuration, the second destination receiving station to the first satellite, configured as a second destination satellite with respect to the second destination receiving station;

the first, second and third satellites of the first configuration or the first and second satellites of the second configuration being interconnected with one another by a space network comprising at least two or at least one inter-satellite link(s), and the first satellite of the third configuration comprising an internal router;

the satellite telecommunication system wherein the origin transmitting station is configured to, in a first step, segment high bit rate data streams received into uncoded BBFRAME packets of large size each having the structure of an uncoded baseband frame BBFRAME as defined by the DVB-S2 protocol and in which a data field is reserved in the header and in the payload of the uncoded BBFRAME packet to receive an on-board routing label of an associated single piece, containing an identifier of the destination receiving station associated with said uncoded BBFRAME packet; and the origin transmitting station is configured to, in a second step, insert, into the on-board routing label, an identifier of the destination receiving station associated with said uncoded BBFRAME packet, code the completed uncoded BBFRAME packet as a coded BBFRAME packet, and transmit the coded BBFRAME packet to the first satellite, configured as origin satellite, the coded BBFRAME packet transmitted being modulated by a predetermined modulation, defined according to the DVB-S2 protocol and compatible with the code used for the DVB-S2 packet; and the first origin satellite is configured to, in a third step, receive, demodulate and decode each coded BBFRAME packet, transmitted by the origin transmitting station in the second step, and extract from the on-board routing label the information identifying the destination receiving station to route, transparently using the space network, the decoded BBFRAME packet to the destination satellite corresponding to the destination receiving station of the uncoded BBFRAME packet.

16. The satellite telecommunication system according to claim 15, wherein the origin transmitting station is configured to, in a fourth step included in the first step, segment high bit rate data streams received into uncoded BBFRAME packets each having the structure of a baseband frame before coding as defined in the DVB-S2 protocol; and the origin transmitting station is configured to, in a fifth step following the fourth step, switch, according to their associated destination receiving station, the uncoded BBFRAME packets whose associated destination receiving stations are the first destination receiving station and/or the second destination receiving station on a first queue defining a first logical channel associated with the first destination receiving station and a second queue defining a first logical channel associated with the second destination receiving station.

* * * * *